Oct. 3, 1933.                A. J. MEYER                1,929,208
                ENGINE AND METHOD OF OPERATING SAME
                      Filed Dec. 14, 1931
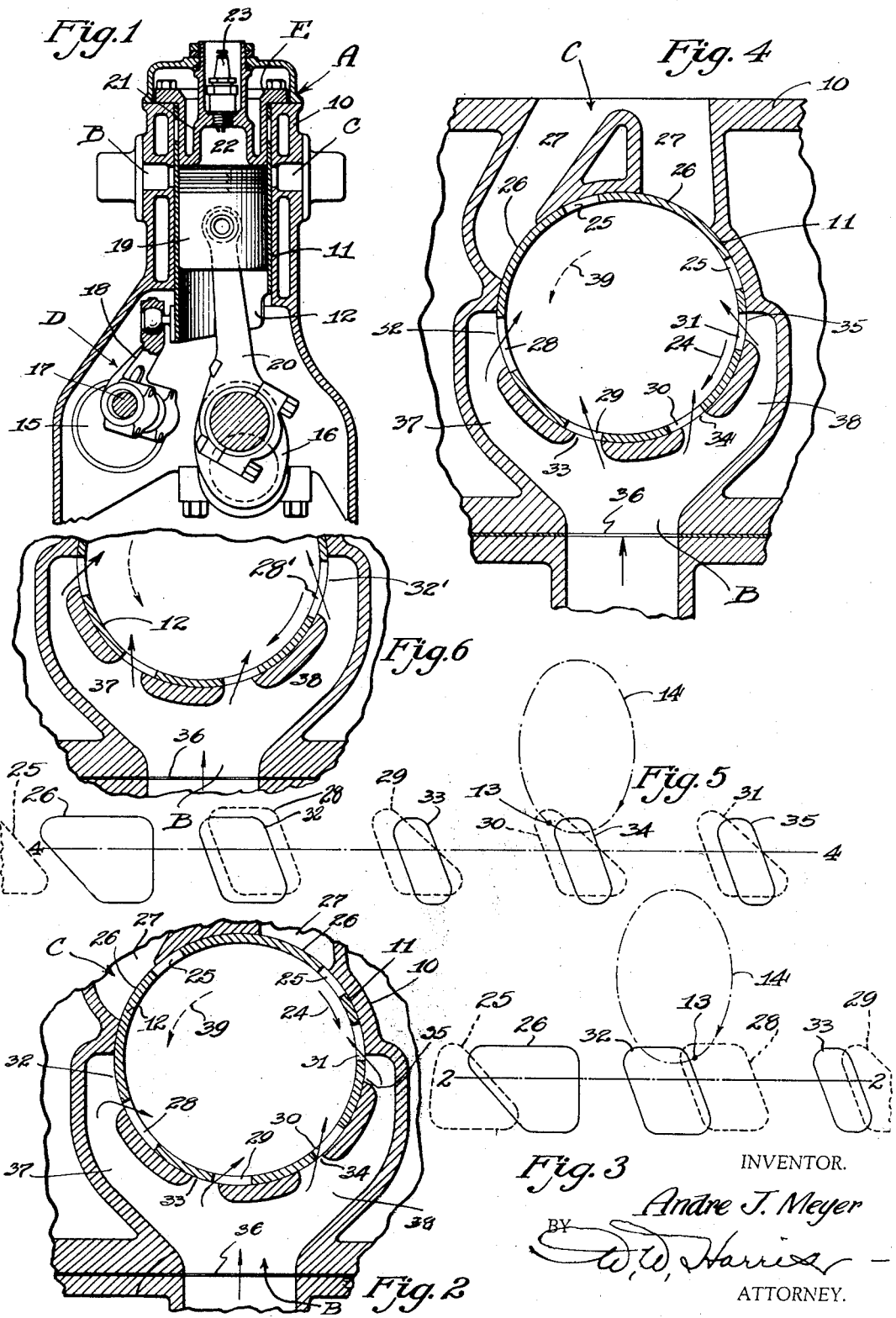
INVENTOR.
Andre J. Meyer
BY
ATTORNEY.

Patented Oct. 3, 1933

1,929,208

UNITED STATES PATENT OFFICE 1,929,208

ENGINE AND METHOD OF OPERATING SAME

Andre J. Meyer, Detroit, Mich., assignor to Continental Motors Corporation, Detroit, Mich., a corporation of Virginia Application December 14, 1931
Serial No. 580,772

25 Claims. (Cl. 123—81)

This invention relates to engines and methods of operating same and refers more particularly to internal combustion engines of the multi-intake ported type such as are common in the general types of sleeve valve engines.

My improvements are particularly related to engines characterized by a swirling action of the intake gas within the engine cylinder or combustion chamber. I have illustrated my invention in connection with an engine operating on the usual four stroke cycle of the type known as the Burt-McCollum single sleeve valve engine. In this type of engine a single sleeve valve associated with each cylinder, and usually intermediate the piston and cylinder, is given a combined reciprocating and oscillating movement in performing the valving functions.

In the aforesaid type of single sleeve valve engine it is customary to open the intake ports of the cylinder and sleeve valve when the sleeve has largely a rotary motion with the result for the the arrangement illustrated that the intake gas, such as air in the instance of a compression ignition engine or carbureted gasoline and air for the spark plug ignition engine illustrated, enters the cylinder tangentially, establishing a gas swirl within and axially around the cylinder and combustion chamber contained therein.

This gas swirl is very desirable in engines, since where the gas is in the nature of fuel mixture, it reduces detonating tendencies, permits higher compression ratios, and generally increases the desirable characteristics of engine performance. However, as the engine speed increases, the gas velocity and resulting swirl increases, the swirl being further stimulated by the piston during gas compression, with the result that excessive swirl is produced and the otherwise desirable engine characteristics cannot be obtained to the desired degree possible by controlling the swirl within practical limits.

It is an object of my invention to provide improved means and methods for supplying the intake gas to the engine cylinder in such a manner as to obtain substantially the proper degree of gas swirl. A further object resides in the provision of differential intake ports or the construction and arrangement of pairs or sets of cylinder and sleeve intake ports of different effective areas or gas conducting capacities whereby the larger cooperating intake ports may be arranged to oppose the swirl by a counter tangential gas entry into the cylinder during intake.

A further object of my invention resides in the method of introducing gas to engine cylinders consisting in tangentially directing the gas through cylinder intake openings of different capacity to create a differential in the swirl producing tendency of the gas.

A still further object of my invention resides in an improved method and means of gas swirl control by utilizing my port passages arranged for swirl and counter swirl in combination with gas conducting means for the cylinder ports consisting of an inlet substantially radially approaching the cylinder and having oppositely extending passages leading circumferentially of the cylinder to conduct gas to the cylinder ports.

In the aforesaid single sleeve valve type of engine it is customary to arrange the intake ports and sleeve travel to induce tangential gas entry to the cylinder during port opening and to arrange the gas conducting means whereby toward port closing and when the ports are fully open, the gas entering the ports to opposite sides of the cylinder with respect to the radial gas inlet respectively promote and oppose the gas swirl. It is an object of my invention in such an engine to construct the swirl opposing port or ports so that they will conduct a larger amount of the intake gas to the cylinder than the port or ports promoting swirl and thereby reduce the net swirl to a desirable degree.

The swirl tendencies established during fully opened intake port position and toward intake closing are especially critical at these times as the piston is then moving rapidly downwardly drawing in relatively large amounts of intake gas and I therefore accomplish my swirl reduction at a time when the tendency toward swirl due to intake is a maximum.

Should it be desired to stimulate the gas swirl in excess of the natural swirl tendencies aforesaid, my invention teaches in its broad aspects, a method whereby the port or ports effecting swirl may be relatively enlarged with respect to the swirl opposing port or ports as will be readily understood from the following detailed description. One instance where such swirl increase might prove beneficial is in connection with an engine operating over relatively low engine speeds, wherein difficulties resulting from excess swirl at high engine speeds encountered in engine powered automobiles are not present.

Further objects and advantages of my invention will be apparent as this specification progresses, reference being had to the accompanying drawing in which:

Fig. 1 is a sectional elevation view through a typical cylinder of the engine,

Fig. 2 is a sectional plan detail view through a typical engine cylinder illustrating port opening, the section being taken along the line 2—2 of Fig. 3, Fig. 3 is a diagrammatic development of a portion of the cylinder and sleeve intake ports for the position shown in Fig. 2, Fig. 4 is a view corresponding to Fig. 2 but showing the intake ports approaching intake closing and approximately in their fully opened position, the section being taken along the line 4—4 of Fig. 5, Fig. 5 is a diagrammatic development of the cylinder and sleeve intake ports, and Fig. 6 is a detail view corresponding to Fig. 4 but illustrating a modification of my invention.

In the drawing the engine A is formed with a cylinder block 10 having spaced bores or cylinders one of which is illustrated at 11, the cylinder block having gas inlet conducting means B and exhaust gas outlet conducting means C. For the particular type of sleeve valve engine illustrated, a single sleeve valve 12 is located within cylinder 11 and is operated with the combined reciprocating and oscillating movement aforesaid whereby any point of the sleeve such as the point 13 of Figs. 3 and 5 is moved in a closed curve path 14 in performing the valving functions of the engine. Any suitable mechanism may be employed to drive the sleeve valve and such mechanism per se is not a part of this invention. Thus I have illustrated a driving mechanism D consisting of a valve shaft 15 adapted to be actuated from the engine crankshaft 16 at half speed for the 4 stroke cycle engine illustrated. The valve shaft carries a wobble crank 17 adapted to actuate a link 18 suitably connected between the wobble crank and sleeve valve so as to impart the aforesaid movement to the sleeve. Within the sleeve valve is located the piston 19 operating crankshaft 16 through the intermediary of the usual connecting rod 20.

A cylinder head structure E closes the outer end of cylinder 11 and is formed with a cylinder re-entrant portion 21 adapted to mask the sleeve ports during explosion of the charge in the combustion chamber 22. This combustion chamber is preferably of the type capable of permitting gas swirl therein around the axis of cylinder 10. The usual spark plug 23 is adapted to fire the charge in combustion chamber 22.

Referring to Figs. 2 and 3 the sleeve valve 12 is illustrated as moving largely with a rotary movement in the direction of arrow 24, intake just commencing and exhaust just closing, it being customary to provide a slight overlap in these valving functions. The sleeve 12 is formed with one or more exhaust ports 25 adapted to cooperate with cylinder exhaust ports 26 whereby exhaust gases are conducted from the cylinder through cylinder block exhaust chamber passages 27, such passages being a part of the exhaust gas conducting means C.

The sleeve 12 is further formed with a plurality of circumferentially spaced intake ports 28, 29, 30 and 31 and while four of these intake ports are illustrated, it should be understood that the number of ports may vary as desired. The cylinder 11 is provided with cooperating companion intake ports 32, 33, 34 and 35, the cooperating cylinder and sleeve intake ports thus being formed in pairs or sets. The intake gas, such as carbureted gasoline and air for the engine illustrated or air in the case of a compression ignition engine, is supplied to the cylinder by gas conducting means B consisting of a gas inlet 36 at one side of the cylinder block 10, the inlet 36 preferably extending substantially radially inwardly of and toward cylinder 11. The gas conducting means B is also formed with gas passages 37 and 38 which extend circumferentially oppositely from inlet 36 for substantially the same circumferential lengths to supply intake gas to the various cylinder intake ports.

In Figs. 2 and 3 it will be apparent that during the early stages of intake opening the gas entering the cooperating intake ports of the cylinder ports will be given a tangential direction so as to induce a rapid swirling motion of the gas indicated by arrow 39 within the cylinder 11, the direction of swirl being opposite to the direction of a rotary sleeve motion at the time of intake opening. As the sleeve ports progress in their movement defined by path 14, the port or ports to the left of inlet 36 (viewing the cylinder as in Figs. 2 and 4) cooperating with passage 37 will conduct the intake gas through such ports in a manner to cause tangential entry of the intake gas into the cylinder in a direction opposite to that of Fig. 2 whereby to oppose the swirl established during the earlier stages of gas intake. Heretofore where the inlet gas is conducted to the cylinder ports in a substantially symmetrical manner, the tangent effect of the intake gas entering the cylinder toward intake closing is in substantial balance, there being no provision for retarding or slowing down the swirl. As illustrated in Fig. 4 the intake ports of the cylinder to the right of inlet 36 cause gas entry to the cylinder with a tangential component adapted to increase the swirl.

One important feature of my invention resides in relatively enlarging the cooperating cylinder and sleeve intake ports 32 and 28 respectively whereby as the sleeve moves toward its intake closing position a relatively large amount of intake gas will be introduced through this set of ports. Since this set of ports tends to oppose the swirl, such swirl will be materially controlled and checked by reason of my porting arrangement which tends to introduce a greater quantity of the intake gas in a manner to oppose the swirl than the remainder of the intake gas tending to promote the swirl, especially during the latter stages of intake opening when the piston is moving inwardly of the cylinder very rapidly to draw in relatively large quantities of intake gas. In Fig. 2 the arrows through the sets of intake ports generally indicate the tangential entry of the intake gas causing swirl and in Fig. 4 similar arrows indicate the swirl promoting and swirl opposing tendencies of the intake gas for the various sets of ports illustrated. In Fig. 4 it will be noted that there is a greater tendency toward swirl reduction than in swirl promotion by reason of my method and means of relatively enlarging the effective port opening or area of one or more sets of ports producing swirl opposing action.

Fig. 5 illustrates the general position of the sleeve and cylinder intake ports corresponding to Fig. 4 and from Figs. 3 and 5 the relatively greater areas of ports 32 and 28 may be readily noted in comparison with the cooperating sets of ports tending to produce swirl.

As hereinbefore stated it is very desirable to produce a certain amount of gas swirl as this has a very beneficial effect on the general engine operation and efficiency. The tendency toward gas swirl during the early stages or intake opening as illustrated in Fig. 2 are very pronounced and while I have provided means for opposing the swirl, I do not contemplate opposing the swirl to a degree approaching swirl elimination but rather I have provided improved means for checking or controlling excess swirl which has a tendency to be produced at relatively high engine speeds. As the speed of the engine increases the velocity of the intake gas increases and since the piston during its compression stroke further promotes swirl, the swirl tends to become excessive as the engine speed increases.

Referring to Fig. 6 I have illustrated my invention adapted to stimulate or promote swirl instead of having a reducing effect on the swirl. Thus in Fig. 6 the set of cylinder and intake ports 32' and 28' to the right of gas inlet 36 have a relatively large area or effective gas conducting passage. In such a construction a larger quantity of intake gas will pass through this relatively large set of ports during the latter stages of intake opening and since these ports are arranged to produce gas swirl the net effect will be a material increase in the swirl tendencies during gas intake. Such an arrangement is particularly advantageous for engines adapted to operate in the lower speed ranges such as is common with industrial engines. Without some further provision for controlling and reducing the amount of swirl existent in the Fig. 6 construction such arrangement would not be beneficial for use in the higher ranges of engine speeds such as commonly dealt with in engines of the type designed to propel automotive vehicles.

What I claim as my invention is:

1. An internal combustion engine having a combustion chamber, a cylinder, a single sleeve valve adapted for movement in a combined oscillating and reciprocating path, said cylinder and sleeve valve having cooperating pairs of gas intake ports, said sleeve valve having largely rotary movement at the beginning of gas intake whereby the intake gas is introduced tangentially into the combustion chamber to impart a swirling movement thereto, means conducting the gas to said ports whereby one of said pairs of ports directs the gas to oppose said swirl toward intake closing, said pair of ports being constructed to provide a relatively large passageway for the gas with respect to another of said pairs of ports whereby to reduce the gas swirl.

2. In an engine of the sleeve valve type having a cylinder, sleeve valve means, cooperating pairs of intake ports in said cylinder and sleeve valve means, one of said pairs of intake ports being relatively enlarged whereby to control gas swirl within the engine cylinder.

3. In an engine of the sleeve valve type, a cylinder having a plurality of intake ports, gas conducting means for said cylinder ports, sleeve valve means controlling said cylinder ports and having intake ports cooperating therewith, one of said cylinder ports and sleeve valve port cooperating therewith being relatively enlarged.

4. In an internal combustion engine, a cylinder, valve means, said cylinder and valve means having cooperating sets of gas intake ports one of which is adapted to induce gas swirl within the cylinder and another of which is adapted to oppose said swirl, said swirl opposing set of intake ports being constructed and arranged to conduct a relatively greater amount of gas within the cylinder than said swirl inducing set of intake ports.

5. In an engine of the sleeve valve type having a cylinder, means conducting gas toward said cylinder, sleeve valve means associated with said cylinder, said cylinder and sleeve valve means having a set of intake ports positioned circumferentially to one side of said gas conducting means and another set positioned circumferentially to the other side of said gas conducting means whereby during gas intake the gas enters the cylinder through said sets of ports in opposing tangential directions, the ports of one of said sets being of larger gas conducting capacity than the ports of the other of said sets.

6. In an engine of the sleeve valve type having a cylinder, means conducting gas toward said cylinder, sleeve valve means associated with said cylinder, said cylinder and sleeve valve having a plurality of sets of cooperating intake ports, the gas entering the cylinder tangentially through said ports at the beginning of gas intake to establish a gas swirl, one of said sets of intake ports being arranged with respect to said gas conducting means whereby the gas enters the cylinder tangentially during gas intake to oppose the gas swirl, said last named set of intake ports having a relatively large gas conducting area with respect to a second set of said cooperating intake ports tending to establish said swirl during said swirl opposing.

7. In an internal combustion engine, a cylinder, sleeve valve means associated with said cylinder, said cylinder and sleeve valve means having a plurality of sets of cooperating gas intake ports, gas passage means for said ports, all of said ports tangentially introducing the gas to said cylinder to produce gas swirl within said cylinder during intake opening, said ports and gas passage means arranged to provide gas swirl and counter-swirl within the cylinder during intake closing, said ports being constructed to introduce a greater amount of gas producing said counter-swirl than producing said swirl during intake closing, said gas passage means being arranged substantially symmetrical radially with respect to said cylinder.

8. An internal combustion engine having a combustion chamber, a cylinder, a single sleeve valve adapted for movement in a combined oscillating and reciprocating path, said cylinder and sleeve valve having cooperating pairs of gas intake ports, said sleeve valve having largely rotary movement at the beginning of gas intake whereby the intake gas is introduced tangentially into the combustion chamber to impart a swirling movement thereto, means conducting the gas to said ports whereby one of said pairs of ports directs the gas to oppose said swirl toward intake closing, said pair of ports being constructed to provide a relatively large passageway for the gas with respect to another of said pairs of ports whereby to reduce the gas swirl, said gas conducting means being arranged substantially symmetrical radially of said cylinder.

9. In an engine of the sleeve valve type having a cylinder, sleeve valve means, cooperating pairs of intake ports in said cylinder and sleeve valve means, one of said pairs of intake ports being relatively enlarged whereby to control gas swirl within the engine cylinder, and means conducting gas toward said cylinder substantially radially with respect thereto for distribution circumferentially of said cylinder to said pairs of intake ports.

10. In an engine of the sleeve valve type, a cylinder having a plurality of intake ports, gas conducting means for said cylinder ports, sleeve valve means controlling said cylinder ports and having intake ports cooperating therewith, one of said cylinder ports and sleeve valve port cooperating therewith being relatively enlarged, said gas conducting means including a gas inlet extending substantially radially toward said cylinder.

11. In an internal combustion engine, a cylinder, and sleeve valve means associated therewith having a plurality of intake ports one of which is enlarged with respect to another.

12. In an engine, a ported cylinder, a sleeve valve associated therewith, means imparting combined oscillating and reciprocating movement to said sleeve valve, said sleeve valve having a plurality of circumferentially aligned spaced intake ports adapted to cooperate with the cylinder ports, one of said intake ports and its cooperating cylinder port having a greater gas passage area than another of said intake and cylinder ports.

13. The method of introducing gas to engine cylinders consisting in tangentially directing the gas toward and within the cylinder through cylinder intake openings of different capacity to create a differential in the swirl producing tendency of the gas.

14. The method of introducing gas to engine cylinders consisting in firstly tangentially introducing the gas to the cylinders through cylinder intake openings of different capacity to create a gas swirl, and secondly impeding the swirl by causing gas flow through a cylinder intake port of relatively large capacity tangentially in a direction opposite to that aforesaid.

15. In an internal combustion engine of the sleeve valve type, a cylinder block having a cylinder provided with a plurality of circumferentially spaced gas intake ports, sleeve valve means associated with said cylinder and having intake ports adapted to cooperate with said cylinder intake ports, cylinder block intake passage means having an inlet extending inwardly of the cylinder block substantially radially of said cylinder, said intake passage means extending substantially oppositely from said inlet circumferentially of said cylinder for substantially the same distance for conducting gas toward said ports, said intake ports introducing the gas tangentially into said cylinder to cause the gas to swirl therein during opening of said intake ports, the total port capacity to one side circumferentially of said inlet being greater than the total port capacity to the other side circumferentially of said inlet.

16. In an internal combustion engine of the sleeve valve type, a cylinder block having a cylinder provided with a plurality of circumferentially spaced gas intake ports, sleeve valve means associated with said cylinder and having intake ports adapted to cooperate with said cylinder intake ports, cylinder block intake passage means having an inlet extending inwardly of the cylinder block substantially radially of said cylinder, said intake passage means extending substantially oppositely from said inlet circumferentially of said cylinder for substantially the same distance for conducting gas toward said ports, said intake ports introducing the gas tangentially into said cylinder to cause the gas to swirl therein during opening of said intake ports, the total port capacity to one side circumferentially of said inlet being greater than the total port capacity to the other side circumferentially of said inlet, said ports of greater capacity being constructed to direct the gas tangentially into said cylinder to oppose said swirl during closing of said intake ports.

17. In an internal combustion engine of the sleeve valve type, a cylinder block having a cylinder provided with a plurality of circumferentially spaced gas intake ports, sleeve valve means associated with said cylinder and having intake ports adapted to cooperate with said cylinder intake ports, cylinder block intake passage means having an inlet extending inwardly of the cylinder block substantially radially of said cylinder, said intake passage means extending substantially oppositely from said inlet circumferentially of said cylinder for substantially the same distance for conducting gas toward said ports, said intake ports introducing the gas tangentially into said cylinder to cause the gas to swirl therein during opening of said intake ports, the total port capacity to one side circumferentially of said inlet being greater than the total port capacity to the other side circumferentially of said inlet, said ports of greater capacity being constructed to direct the gas tangentially into said cylinder to oppose said swirl during closing of said intake ports, said ports of lesser capacity being constructed to direct the gas tangentially into said cylinder to promote said swirl during closing of said intake ports.

18. In an engine structure provided with a plurality of gas inlet ports, valving means for controlling said ports, means for conducting said gas to said ports, said gas being caused to swirl within the engine during opening and closing of one of said ports and at the opening of another of said ports, said last port being constructed and arranged to cause said gas to have a counter-swirl tendency during the closing thereof.

19. In an engine structure provided with a plurality of gas inlet ports, valving means for controlling said ports, means for conducting said gas to said ports, said gas being caused to swirl within the engine during opening and closing of one of said ports and at the opening of another of said ports, said last port being constructed and arranged to cause said gas to have a counter-swirl tendency during the closing thereof whereby the net swirl is reduced prior to ignition.

20. In an engine structure provided with a plurality of gas inlet ports, valving means for controlling said ports, means for conducting said gas to said ports, said gas being caused to swirl within the engine during opening and closing of one of said ports and at the opening of a plurality of other of said ports, said other ports being constructed and arranged to cause said gas to have a counter-swirl tendency during closing thereof.

21. In an engine, a cylinder, sleeve valve means, said cylinder and sleeve valve means having a plurality of pairs of cooperating intake gas ports, one of said pairs being relatively enlarged as to its gas conducting capacity whereby to control gas swirl within said cylinder.

22. In an engine, a cylinder, sleeve valve means, said cylinder and sleeve valve means having a plurality of pairs of cooperating intake gas ports, one of said pairs being relatively enlarged as to its gas conducting capacity whereby to oppose gas swirl within said cylinder.

23. In a sleeve valve engine having a cylinder structure provided with a plurality of intake ports circumferentially arranged toward one side of the engine, said cylinder structure having an opening at said engine side for conducting an intake gas to said ports, said opening being substantially symmetrically arranged relative to its distance to the end ports, sleeve valve means ported for cooperation with said cylinder ports to provide gas passages through said cylinder and sleeve valve means, one of said gas passages having a relatively great capacity to cause the gas passing therethrough to exert a controlling influence on gas swirl within said cylinder.

24. In an engine, a cylinder having a plurality of intake ports, a single sleeve valve having combined reciprocation and oscillation, said sleeve being associated with said cylinder and having ports cooperating with said cylinder ports to provide intake passages, one of said passages providing a relatively large capacity of flow therethrough with respect to another of said passages.

25. In an engine, a cylinder having a plurality of intake ports, a single sleeve valve having combined reciprocation and oscillation, said sleeve being associated with said cylinder and having ports cooperating with said cylinder ports to provide intake passages, one of said passages providing a relatively large capacity of flow therethrough whereby to control gas swirl within said cylinder.

ANDRE J. MEYER.